(12) United States Patent
Nakagawa et al.

(10) Patent No.: US 11,044,515 B2
(45) Date of Patent: Jun. 22, 2021

(54) TRANSMISSION/RECEPTION SYSTEM, TRANSMITTER, AND TRANSMISSION/RECEPTION METHOD

(71) Applicant: NEW MEDIA CO., LTD., Yamagata (JP)

(72) Inventors: Hiroki Nakagawa, Yamagata (JP); Kotaro Kasai, Niigata (JP); Fumichika Chaya, Hokkaido (JP)

(73) Assignee: NEW MEDIA CO., LTD., Yamagata (JP)

( * ) Notice: Subject to any disclaimer, the term of this patent is extended or adjusted under 35 U.S.C. 154(b) by 219 days.

(21) Appl. No.: 16/473,774

(22) PCT Filed: Mar. 31, 2017

(86) PCT No.: PCT/JP2017/013788
§ 371 (c)(1),
(2) Date: Jun. 26, 2019

(87) PCT Pub. No.: WO2018/123093
PCT Pub. Date: Jul. 5, 2018

(65) Prior Publication Data
US 2019/0342604 A1 Nov. 7, 2019

(30) Foreign Application Priority Data
Dec. 27, 2016 (JP) .............................. JP2016-254306

(51) Int. Cl.
*G06F 3/00* (2006.01)
*G06F 13/00* (2006.01)
(Continued)

(52) U.S. Cl.
CPC ..... *H04N 21/4314* (2013.01); *H04N 21/4821* (2013.01)

(58) Field of Classification Search
CPC ............. H04N 21/482; H04N 21/4821; H04N 21/4314
See application file for complete search history.

(56) References Cited

U.S. PATENT DOCUMENTS

| 5,537,153 A | 7/1996 | Shigihara | |
|---|---|---|---|
| 2010/0083316 A1* | 4/2010 | Togashi | H04N 21/47 725/41 |
| 2010/0125874 A1* | 5/2010 | Ahn | H04N 21/4343 725/41 |

FOREIGN PATENT DOCUMENTS

| EP | 0529700 A1 | 3/1993 |
|---|---|---|
| JP | H5199502 A | 8/1993 |

(Continued)

OTHER PUBLICATIONS

Notice of Preliminary Rejection issued in corresponding Korean Patent Application No. 10-2019-7018390 dated Apr. 21, 2020, with translation (12 pages).

(Continued)

*Primary Examiner* — Kyu Chae
(74) *Attorney, Agent, or Firm* — Osha Bergman Watanabe & Burton LLP

(57) ABSTRACT

A transmission/reception system includes a transmitter and a receiver. The transmitter includes a first circuit that: acquires plural pieces of broadcast image data; categorizes the broadcast image data at least into first and second groups; generates program guide screen data that switches between first and second program guide screen data; generates temporal information about the predetermined time interval and broadcast program identification information; and transmits the screen data and the information. The receiver includes a second circuit that: receives the data and the information; outputs the program guide screen data; detects, when any one of the display frames is selected by a (Continued)

user operation, broadcast program identification information contained in the first or second program guide screen data; and performs control in such a way that the broadcast image data corresponding to the detected broadcast program identification information are output from the image data output device.

8 Claims, 15 Drawing Sheets

(51) Int. Cl.
*H04N 5/445* (2011.01)
*H04N 21/431* (2011.01)
*H04N 21/482* (2011.01)

(56) References Cited

FOREIGN PATENT DOCUMENTS

| JP | H6351017 A | 12/1994 |
|---|---|---|
| JP | H8289264 A | 11/1996 |
| JP | 2003299043 A | 10/2003 |
| JP | 2004274257 A | 9/2004 |
| JP | 2005260647 A | 9/2005 |
| JP | 2014192756 A | 10/2014 |

OTHER PUBLICATIONS

Written Decision of Patent Grant issued in the counterpart Korean Patent Application No. 10-2019-7018390, dated Oct. 22, 2020 (4 pages).

Notice of Reasons for Refusal issued in corresponding Japanese Patent Application No. 2016-254306, dated Nov. 7, 2017, with translation (4 pages).

International Search Report issued in corresponding International Application No. PCT/JP2017/013788, dated Jun. 27, 2017, with translation (5 pages).

Written Opinion issued in corresponding International Application No. PCT/JP2017/013788, dated Jun. 27, 2017, with translation (9 pages).

* cited by examiner

FIG. 2
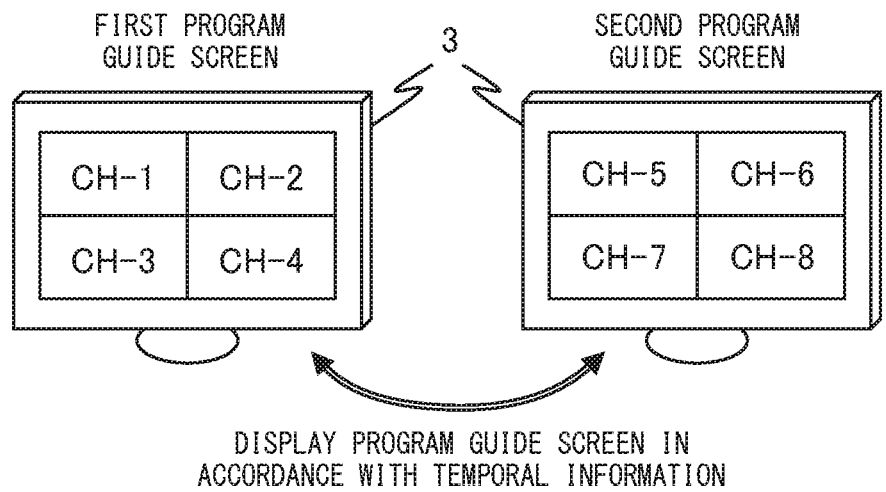
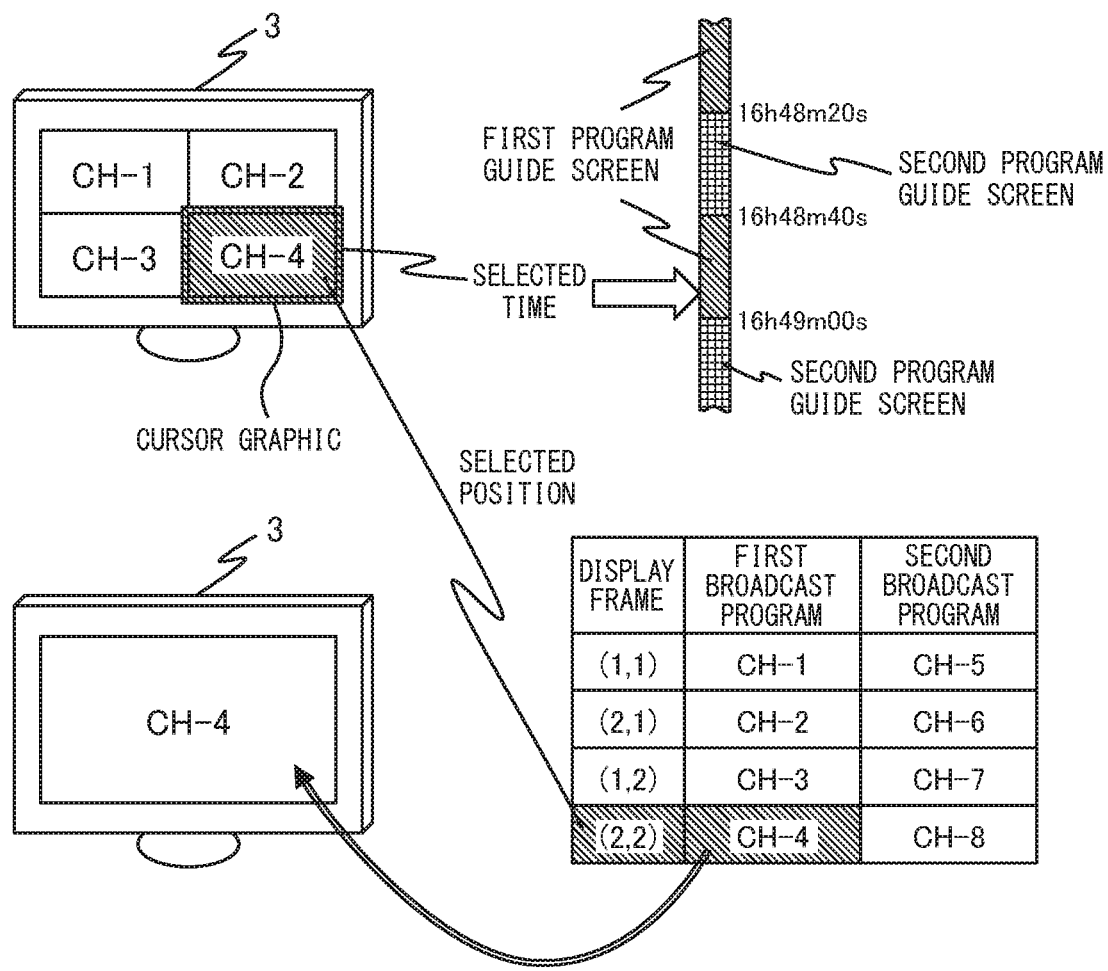

FIG. 6A

| CHANNEL 01 (CH-01) | CHANNEL 02 (CH-02) | CHANNEL 03 (CH-03) | CHANNEL 04 (CH-04) | CHANNEL 05 (CH-05) |
|---|---|---|---|---|
| CHANNEL 06 (CH-06) | CHANNEL 07 (CH-07) | CHANNEL 08 (CH-08) | CHANNEL 09 (CH-09) | CHANNEL 10 (CH-10) |
| CHANNEL 11 (CH-11) | CHANNEL 12 (CH-12) | CHANNEL 13 (CH-13) | CHANNEL 14 (CH-14) | CHANNEL 15 (CH-15) |
| CHANNEL 16 (CH-16) | CHANNEL 17 (CH-17) | CHANNEL 18 (CH-18) | CHANNEL 19 (CH-19) | CHANNEL 20 (CH-20) |

FIG. 6B

| CHANNEL 21 (CH-21) | CHANNEL 22 (CH-22) | CHANNEL 23 (CH-23) | CHANNEL 24 (CH-24) | CHANNEL 25 (CH-25) |
|---|---|---|---|---|
| CHANNEL 26 (CH-26) | CHANNEL 27 (CH-27) | CHANNEL 28 (CH-28) | CHANNEL 29 (CH-29) | CHANNEL 30 (CH-30) |
| CHANNEL 31 (CH-31) | CHANNEL 32 (CH-32) | CHANNEL 33 (CH-33) | CHANNEL 34 (CH-34) | CHANNEL 35 (CH-35) |
| CHANNEL 36 (CH-36) | CHANNEL 37 (CH-37) | CHANNEL 38 (CH-38) | CHANNEL 39 (CH-39) | CHANNEL 40 (CH-40) |

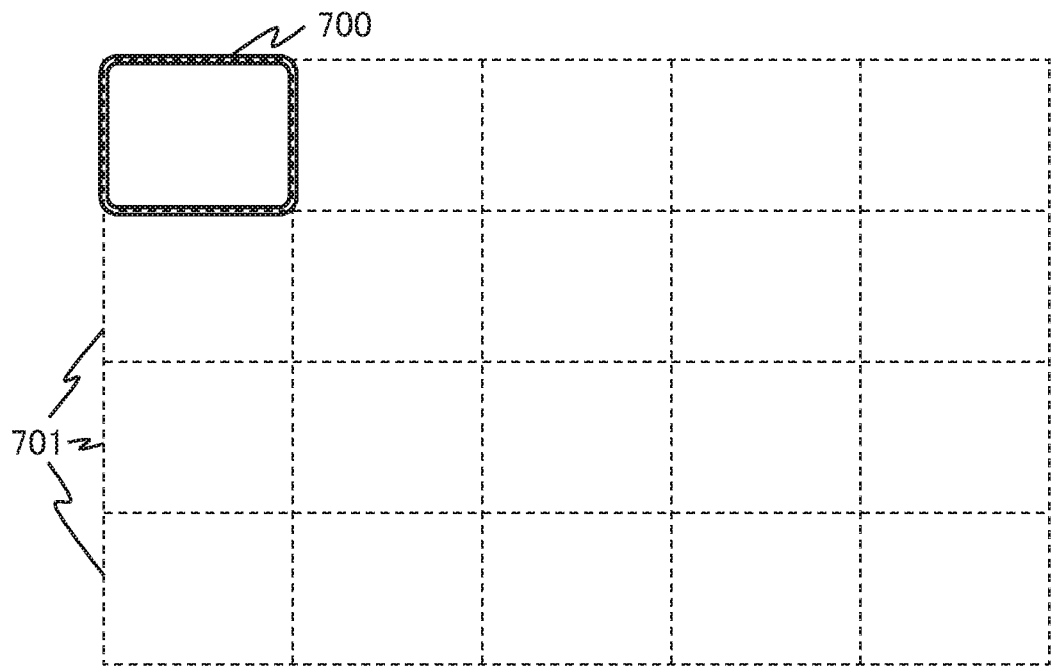

FIG. 8B

| CHANNEL 21 PICTURE | CHANNEL 22 PICTURE | CHANNEL 23 PICTURE | CHANNEL 24 PICTURE | CHANNEL 25 PICTURE |
|---|---|---|---|---|
| CHANNEL 26 PICTURE | CHANNEL 27 PICTURE | CHANNEL 28 PICTURE | CHANNEL 29 PICTURE | CHANNEL 30 PICTURE |
| CHANNEL 31 PICTURE | CHANNEL 32 PICTURE | CHANNEL 33 PICTURE | CHANNEL 34 PICTURE | CHANNEL 35 PICTURE |
| CHANNEL 36 PICTURE | CHANNEL 37 PICTURE | CHANNEL 38 PICTURE | CHANNEL 39 PICTURE | CHANNEL 40 PICTURE |

FIG. 9A

| CHANNEL 01 PICTURE | CHANNEL 02 PICTURE | CHANNEL 03 PICTURE | CHANNEL 04 PICTURE | CHANNEL 05 PICTURE |
|---|---|---|---|---|
| CHANNEL 06 PICTURE | CHANNEL 07 PICTURE | CHANNEL 08 PICTURE | CHANNEL 09 PICTURE | CHANNEL 10 PICTURE |
| CHANNEL 11 PICTURE | CHANNEL 12 PICTURE | CHANNEL 13 PICTURE | CHANNEL 14 PICTURE | CHANNEL 15 PICTURE |
| CHANNEL 16 PICTURE | CHANNEL 17 PICTURE | CHANNEL 18 PICTURE | CHANNEL 19 PICTURE | CHANNEL 20 PICTURE |

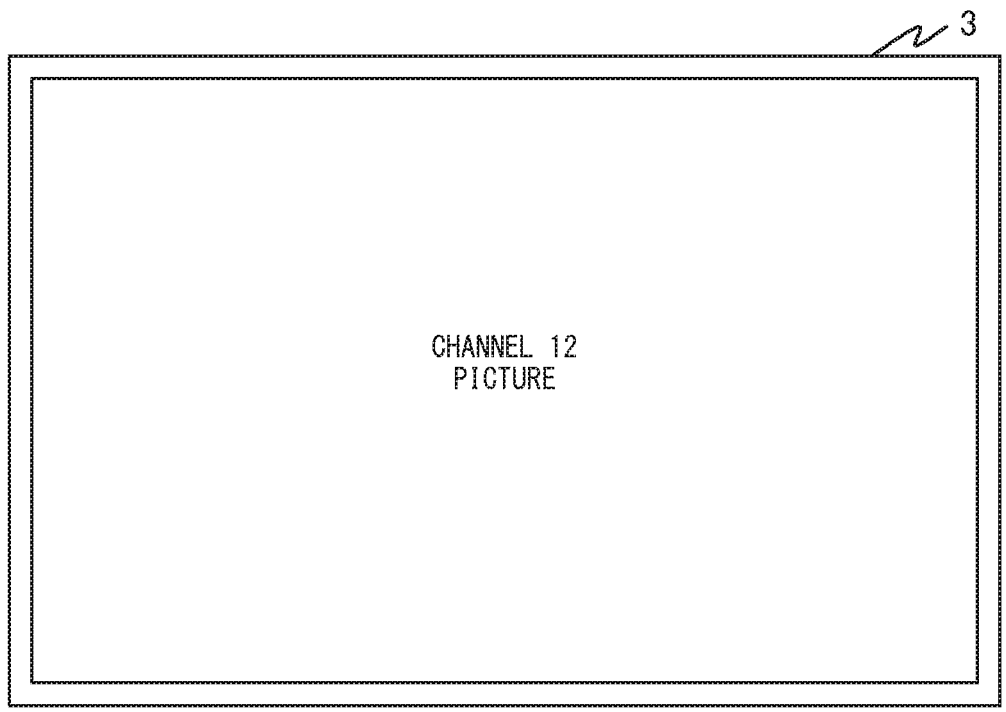

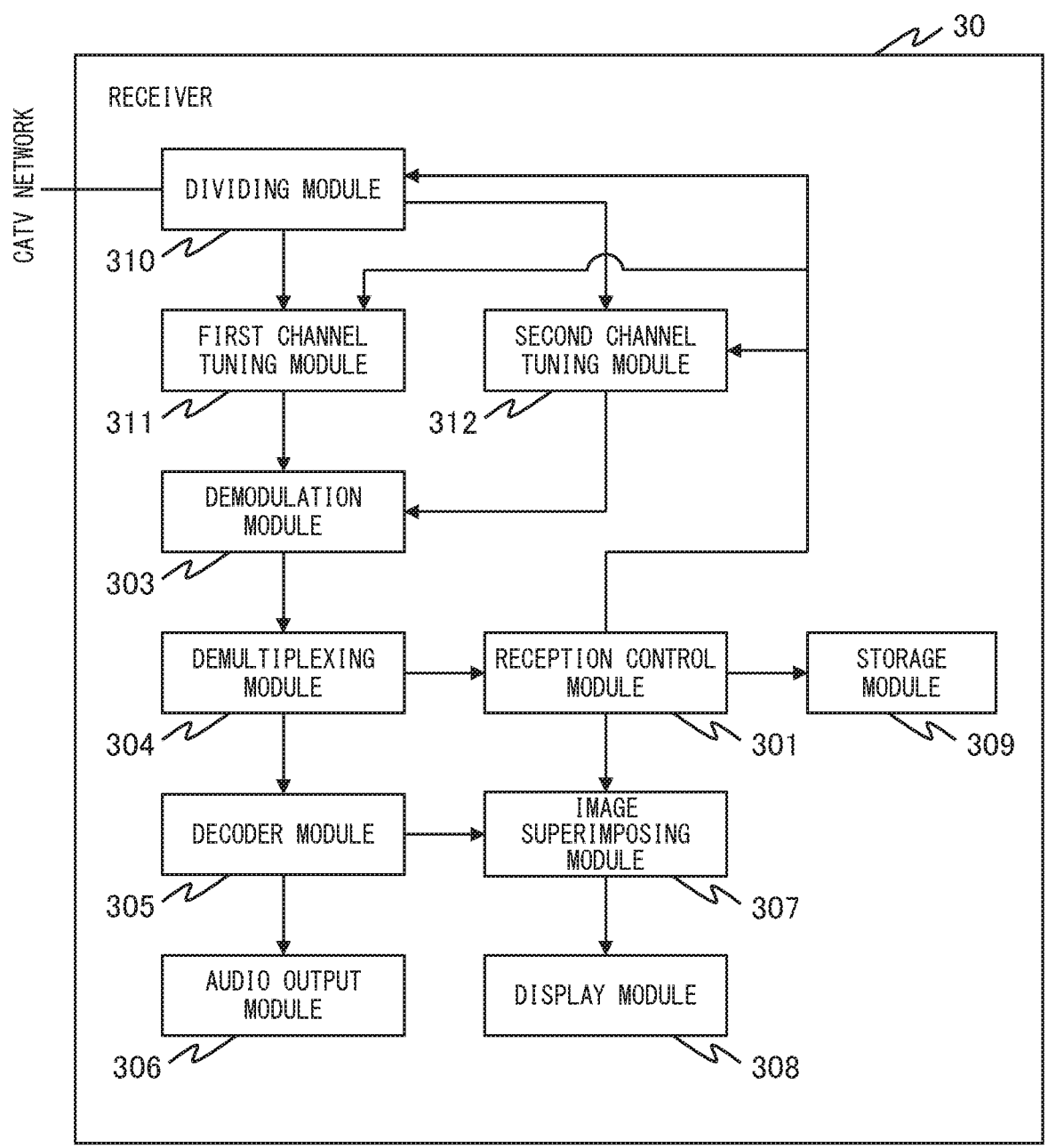

TRANSMISSION/RECEPTION SYSTEM, TRANSMITTER, AND TRANSMISSION/RECEPTION METHOD

FIELD

The present invention relates to a transmission/reception system, a transmitter, and a transmission/reception method.

BACKGROUND

Recently, there have been known transmission/reception systems in which operation by a viewer of a receiver that displays a program guide screen broadcast from a broadcasting apparatus of a broadcasting station enables the receiver to tune in to a broadcast program transmitted from a transmitter. In such transmission/reception systems, the receiver displays program guidance information such as textual guidance information or pictorial guidance information in such a way that the information can be selected. When the viewer makes an operation for selecting the program guidance information displayed on the receiver, tuning is made in to a broadcast program corresponding to the selected program guide information. And the receiver displays broadcast image data of the broadcast program in to which the tuning is made.

For example, Patent Document 1 recites an electronic program guide receiver that causes a display device to display multiple screens in which pictures of 16 broadcast channels are displayed on respective sub-screens obtained by dividing a single screen into multiple pieces. In the electronic program guide receiver, when a viewer selects any one of the sub-screens, tuning is made in to a broadcast channel corresponding to the selected sub-screen. The electronic program guide receiver performs, when a cursor displayed on the display device is located in each sub-screen, processes such as a channel tuning process caused by the viewer's channel selection operation and a process of displaying content of a program corresponding to a sub-screen in which the cursor is located.

PRIOR ART DOCUMENT

Patent Document

Patent Document 1: Japanese Unexamined Patent Publication (Kokai) No. H8-289264

SUMMARY

However, in conventional broadcast program selection systems, a number of broadcast programs on which guidance can be provided is limited to a number of display areas (sub-screens) into which a single screen is divided. Therefore, as the number of broadcast programs to be provided with guidance increases, a size of each display area is reduced; as a result, when the number of broadcast programs to be provided with guidance exceeds a certain number, there have been cases where content of a program displayed in a display area is hardly visible for the viewer.

The present invention has been made to solve such a problem, and an object of the present invention is to provide a transmission/reception system, a transmitter, and a transmission/reception method, which can provide a program guide screen having high visibility for a viewer irrespective of the number of broadcast programs to be provided with guidance.

According to an aspect of a transmission/reception system, a transmission/reception system having a transmitter and a receiver is provided. The transmitter includes an acquisition module for acquiring plural pieces of broadcast image data corresponding to broadcast programs, a categorizing module for categorizing the acquired plural pieces of broadcast image data at least into a first group and a second group, a screen data generation module for generating program guide screen data that switches, at a predetermined time interval, between first program guide screen data for displaying plural pieces of broadcast image data included in the first group in respective display frames arranged on a same screen and second program guide screen data for displaying plural pieces of broadcast image data included in the second group in respective display frames, which display frames are identical to the display frames arranged on a same screen, a broadcasting information generation module for generating temporal information about the predetermined time interval and broadcast program identification information corresponding to plural pieces of broadcast image data contained in each of the first program guide screen data and the second program guide screen data, and a transmitting module for transmitting the program guide screen data, the temporal information, and the broadcast program identification information. The receiver includes a reception module for receiving the plural pieces of broadcast image data corresponding to broadcast programs, the program guide screen data, the temporal information, and the broadcast program identification information, an image data output module for outputting the program guide screen data, a detection module for detecting, when any one of the display frames is selected by a user operation, broadcast program identification information contained in the first program guide screen data or the second program guide screen data output at the time of selection and corresponding to the selected display frame, and a control module for performing control in such a way that the broadcast image data corresponding to the detected broadcast program identification information are output from the image data output module.

According to an aspect of the transmission/reception system, wherein the broadcast image data corresponding to broadcast programs received by the reception module are contained in broadcast data transmitted from a broadcasting station.

According to an aspect of the transmission/reception system, wherein the transmitting module transmits the plural pieces of broadcast image data corresponding to broadcast programs to the receiver.

According to an aspect of the transmission/reception system, wherein the image data output module displays a program guide screen, based on the program guide screen data, and displays a cursor graphic at a position of any one of the display frames arranged in the displayed program guide screen in such a way that the cursor graphic can move, and wherein the detection module selects, when selection is input by a user, a display frame in which the cursor graphic is located.

According to an aspect of the transmission/reception system, wherein the receiver further comprises a storage module, and wherein the control module stores a display position of the selected display frame in the storage module, and acquires, when a user instructs output of the program guide screen data, the display position stored in the storage module, displays a program guide screen, and displays the cursor graphic in a display frame at the acquired display position.

According to an aspect of the transmission/reception system, wherein the cursor graphic is displayed in a display mode according to a predetermined condition.

According to an aspect of a transmitter, a transmitter that transmits broadcast data to a receiver is provided. The transmitter includes an acquisition module for acquiring plural pieces of broadcast image data corresponding to broadcast programs, a categorizing module for categorizing the acquired plural pieces of broadcast image data at least into a first group and a second group, a screen data generation module for generating program guide screen data that switches, at a predetermined time interval, between first program guide screen data for displaying plural pieces of broadcast image data included in the first group in respective display frames arranged on a same screen and second program guide screen data for displaying plural pieces of broadcast image data included in the second group in respective display frames, which display frames are identical to the display frames arranged on a same screen, a broadcasting information generation module for generating temporal information about the predetermined time interval and broadcast program identification information corresponding to plural pieces of broadcast image data contained in each of the first program guide screen data and the second program guide screen data, and a transmitting module for transmitting the program guide screen data, the temporal information, and the broadcast program identification information to the receiver.

According to an aspect of a transmission/reception method, a transmission/reception method by a transmission/reception system comprising a transmitter and a receiver including an image data output module is provided. The transmitter acquires plural pieces of broadcast image data corresponding to broadcast programs, categorizes the acquired plural pieces of broadcast image data at least into a first group and a second group, generates program guide screen data that switches, at a predetermined time interval, between first program guide screen data for displaying plural pieces of broadcast image data included in the first group in respective display frames arranged on a same screen and second program guide screen data for displaying plural pieces of broadcast image data included in the second group in respective display frames, which display frames are identical to the display frames arranged on a same screen, generates temporal information about the predetermined time interval and broadcast program identification information corresponding to plural pieces of broadcast image data contained in each of the first program guide screen data and the second program guide screen data, and transmits the program guide screen data, the temporal information, and the broadcast program identification information. The receiver receives the plural pieces of broadcast image data corresponding to broadcast programs, the program guide screen data, the temporal information, and the broadcast program identification information, outputs the program guide screen data, detects, when any one of the display frames is selected by a user operation, broadcast program identification information contained in the first program guide screen data or the second program guide screen data output at the time of selection and corresponding to the selected display frame, and performs control in such a way that the broadcast image data corresponding to the detected broadcast program identification information are output from the image data output module.

The transmission/reception system, the transmitter, and the transmission/reception method can provide a program guide screen having high visibility for a viewer irrespective of the number of broadcast programs to be provided with guidance.

BRIEF DESCRIPTION OF DRAWINGS

FIG. 2 is a schematic diagram for explaining the outline of the transmission/reception system 1;

FIG. 6A is a schematic diagram for explaining an outline of first program guide screen data;

FIG. 6B is a schematic diagram for explaining an outline of second program guide screen data;

FIG. 7 is a schematic diagram for explaining an outline of a cursor graphic;

FIG. 8A is a diagram illustrating an example of a first program guide screen;

FIG. 8B is a diagram illustrating an example of a second program guide screen;

FIG. 9A is a diagram illustrating an example of the first program guide screen;

FIG. 9B is a diagram illustrating an example of a screen displaying a broadcast image of a broadcast program;

FIG. 10A is a diagram illustrating an example of the second program guide screen;

FIG. 15 is a diagram illustrating an example of a schematic configuration of a receiver 30.

DESCRIPTION OF EMBODIMENTS

Various example embodiments of the present invention will be described below with reference to the drawings. However, it should be noted that a technical scope of the present invention is not limited to the example embodiments and extends to the inventions recited in the claims and equivalents thereof.

A transmission/reception system 1 includes a transmitter 2 owned by a broadcaster etc. and a receiver 3 installed at each house etc. The transmitter 2 generates broadcast data in accordance with an operation by the broadcaster etc., and transmits the generated broadcast data to the receiver 3 via a transmission site etc. The transmitter 2 may transmit the generated broadcast data to the receiver 3 via a cable television (CATV) network.

The broadcast data includes image data, audio data, and broadcasting information data. The image data are, for example, video data, still image data etc. of a broadcast program. The broadcasting information data are graphic image data, character data and/or control data, which are described by a description language such as BML (Broadcast Markup Language). The graphic image data and the character data are displayed by a BML browser etc. executed by the receiver 3. The control data are data for specifying control information for display control etc.; for example, data for specifying control information for moving and displaying graphic image data or executing a channel tuning process according to an operation information input by a viewer.

The transmitter 2 generates program guide screen data as broadcast data for selecting a broadcast program. The program guide screen data are image data for causing the receiver 3 to display at least two program guide screens. Description will be made below taking a case where two pieces of program guide screen data exist as an example with reference to FIGS. 1 and 2. Of the two pieces of program guide screen data, one of the program guide screen data may be referred to as first program guide screen data while the other of the program guide screen data may be referred to as second program guide screen data.

Figure 1:
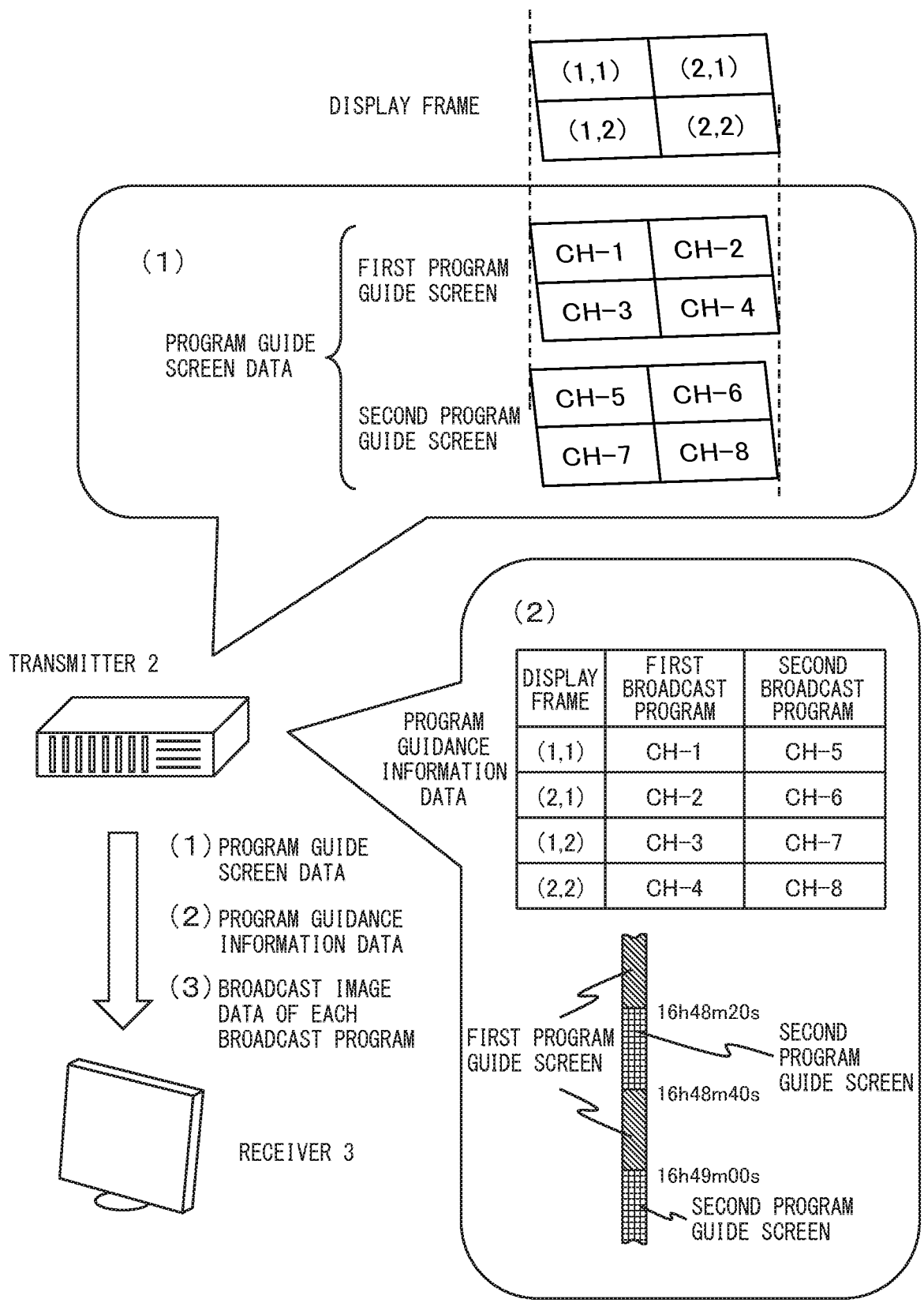
FIG. 1 is a schematic diagram for explaining an outline of a transmission/reception system 1.

FIG. 1 is a schematic diagram for explaining an outline of the transmission/reception system 1.

First, the transmitter 2 acquires plural pieces of broadcast image data corresponding to broadcast programs. In an example illustrated in (1) of FIG. 1, the transmitter 2 acquires plural pieces of broadcast image data, each of which corresponds to individual broadcast programs on channels 1 to 8 and which are on the air. Broadcast program identification information for identifying channels 1 to 8 are CH-1 to CH-8.

The transmitter 2 then categorizes the acquired plural pieces of broadcast image data into a first group and a second group. In the example illustrated in (1) of FIG. 1, the acquired plural pieces of broadcast image data are categorized into the first group including broadcast image data corresponding to channels 1 to 4 and the second group including broadcast image data corresponding to channels 5 to 8. The transmitter 2 may categorize the acquired plural pieces of broadcast image data into three or more groups. Hereinafter, a broadcast program represented by broadcast image data included in the first group may be referred to as a first broadcast program while a broadcast program represented by broadcast image data included in the second group may be referred to as a second broadcast program.

Subsequently, the transmitter 2 generates first program guide screen data for displaying plural pieces of first broadcast image data included in the first group in respective display frames arranged on the same screen. Each of the display frames is, for example, a rectangular shape and corresponds to each of the plural pieces of first broadcast image data. Each piece of the first broadcast image data is reduced to an image size that can be displayed in each corresponding display frame. The shape of each display frame is not limited to a rectangular shape and may be any shape. A reduction ratio for the image size to be displayed in a display frame may be any reduction ratio.

The transmitter 2 also generates second program guide screen data for displaying plural pieces of second broadcast image data included in the second group in respective display frames arranged on the same screen. The display frames in the first program guide screen data are the same display frames as those in the second program guide screen data. Broadcast program identification information and a display position are stored in association with each of the display frames. The display position associated with each display frame is coordinate information representing a position of each display frame in the same screen, coordinate information for defining a shape of each display frame, etc.

In the example illustrated in FIG. 1, the display frames are arranged in two columns in a vertical direction and in two rows in a horizontal direction. The display frame for channel 1 in the first program guide screen data and the display frame for channel 5 in the second program guide screen data are associated with coordinate information for (1, 1) as the display position. The display frame for channel 2 in the first program guide screen data and the display frame for channel 6 in the second program guide screen data are associated with coordinate information for (2, 1) as the display position. The display frame for channel 3 in the first program guide screen data and the display frame for channel 7 in the second program guide screen data are associated with coordinate information for (1, 2) as the display position. The display frame for channel 4 in the first program guide screen data and the display frame for channel 8 in the second program guide screen data are associated with coordinate information for (2, 2) as the display position.

Next, the transmitter 2 generates program guide screen data that switches between the first program guide screen data and the second program guide screen data, which have been generated, at a predetermined time interval. The predetermined time interval is, for example, 20 seconds.

The transmitter 2 also generates, as illustrated in (2) of FIG. 1, program guidance information data as broadcast data for selecting a broadcast program. The program guidance information data are broadcasting information data that contains broadcast program identification information contained in the program guide screen data and temporal information about the predetermined time interval for switching between the first program guide screen data and the second program guide screen data. The program guidance information data may contain image data of graphics including a cursor graphic.

The broadcast program identification information contained in the program guide screen data is broadcast program identification information corresponding to each of first broadcast programs and second broadcast programs. Each display position of the display frames in the first program guide screen data is associated with the broadcast program identification information of a broadcast program corresponding to each display frame. Each display position of the display frames in the second program guide screen data is associated with the broadcast program identification information of a broadcast program corresponding to each display frame. In an example illustrated in (2) of FIG. 1, the display frame at the display position represented by the coordinate information for (1, 1) is associated with CH-1 as the broadcast program identification information of the first broadcast program and also associated with CH-5 as the broadcast program identification information of the second broadcast program. The display frame at the display position represented by the coordinate information for (2, 1) is associated with CH-2 as the broadcast program identification information of the first broadcast program and also associated with CH-6 as the broadcast program identification information of the second broadcast program. The display frame at the display position represented by the coordinate information for (1, 2) is associated with CH-3 as the broadcast program identification information of the first broadcast program and also associated with CH-7 as the broadcast program identification information of the second broadcast program. The display frame at the display position represented by the coordinate information for (2, 2) is associated with CH-4 as the broadcast program identification information of the first broadcast program and also associated with CH-8 as the broadcast program identification information of the second broadcast program.

The temporal information about the predetermined time interval for switching between the first program guide screen data and the second program guide screen data are, for example, status information, switching timing information, etc. The status information is, during the period of time in which the first program guide screen data is transmitted, screen identification information indicating the first program guide screen data. The status information is, during the period of time in which the second program guide screen data is transmitted, screen identification information indicating the second program guide screen data. The switching timing information is information representing a time for switching from the first program guide screen data to the second program guide screen data and also information representing a time for switching from the second program guide screen data to the first program guide screen data.

The transmitter 2 transmits the program guide screen data and the program guidance information data, which have been generated as broadcast data for selecting a broadcast program to the receiver 3. When transmitting the broadcast data to the receiver 3 via a CATV network, the transmitter 2 may transmit all or part of the plural pieces of broadcast image data of broadcast programs to the receiver 3.

FIG. 2 is a schematic diagram for explaining the outline of the transmission/reception system 1.

As illustrated in FIG. 2, the receiver 3 that has received the program guide screen data and the program guidance information data, which have been transmitted by the transmitter 2, and the acquired broadcast image data of each of broadcast programs outputs the program guide screen data to the display module. In other words, the receiver 3 displays, on the basis of the program guide screen data, the first program guide screen and the second program guide screen on the display module while performing switching between them in accordance with the temporal information.

The receiver 3 also displays, on the basis of the graphic image data contained in the program guidance information data, a cursor graphic in such a way that the cursor graphic is movably superimposed on the first program guide screen and the second program guide screen to be displayed. The cursor graphic is a graphic having a frame shape, which shape is the same as or similar to that of each of the display frames, and it is moved to and displayed at, in response to an operation by a user with a control device such as a remote, the position of each display frame on the screen. The cursor graphic may have any shape as long as the user can identify, when the cursor graphic is displayed on a display frame, the display frame in which the cursor graphic is located.

When the cursor graphic is displayed at the position of the display frame desired by the user and a selection instruction is input in response to an operation of the control device by the user, the receiver 3 acquires the display position of the display frame at which the cursor graphic is located as the selected position. The receiver 3 then determines, on the basis of the temporal information, which of the first program guide screen data and the second program guide screen data the guide screen data output at the time when the selection instruction is input is.

Subsequently, the receiver 3 detects, on the basis of the acquired selected position and the determined guide screen data, broadcast program identification information. In an example illustrated in FIG. 2, it is determined that the guide screen displayed at the time when the selection instruction is input is the first program guide screen, and the coordinate information for (2, 2) is acquired as the selected position. In this manner, the broadcast program identification information (CH-4) corresponding to the display frame at the selected position represented by the coordinate information for (2, 2) is detected from the first broadcast programs.

The receiver 3 then displays broadcast image data of the broadcast program corresponding to the detected broadcast program identification information (CH-4) on the display module.

As described above, the transmission/reception system 1 can provide plural pieces of program guide screen data to the user. Thus, it is possible to prevent an image etc. for introducing each program from becoming too small on each program guide screen, and the user will be able to easily select a broadcast program. Therefore, it is possible to provide a program guide screen having high visibility for a viewer irrespective of the number of broadcast programs to be provided with guidance.

It should be noted that the description for FIG. 1 and FIG. 2 described above is description for promoting better understanding of the present invention. More specifically, the present invention is embodied in each of example embodiments to be described below, and the present invention may be embodied without substantially overstepping principles of the present invention by various variations. All such variations shall be encompassed by the scope of the present invention and the present description.

Figure 3:
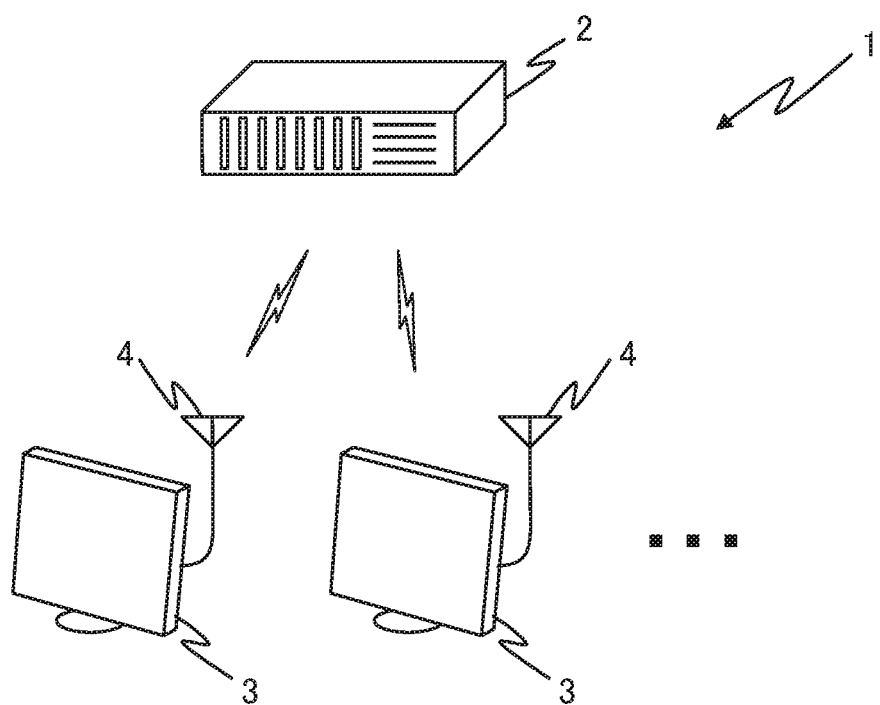
FIG. 3 is a diagram illustrating an example of a schematic configuration of the transmission/reception system 1.

(A schematic configuration of the transmission/reception system 1) FIG. 3 is a diagram illustrating an example of a schematic configuration of the transmission/reception system 1.

The transmission/reception system 1 includes a transmitter 2 and a receiver 3. The receiver 3 is, for example, a television set etc., and it is connected to an antenna module 4. The receiver 3 receives broadcast data transmitted from the transmitter 2 via the antenna module 4, displays image data contained in the broadcast data and outputs audio data contained in the broadcast data.

Figure 4:
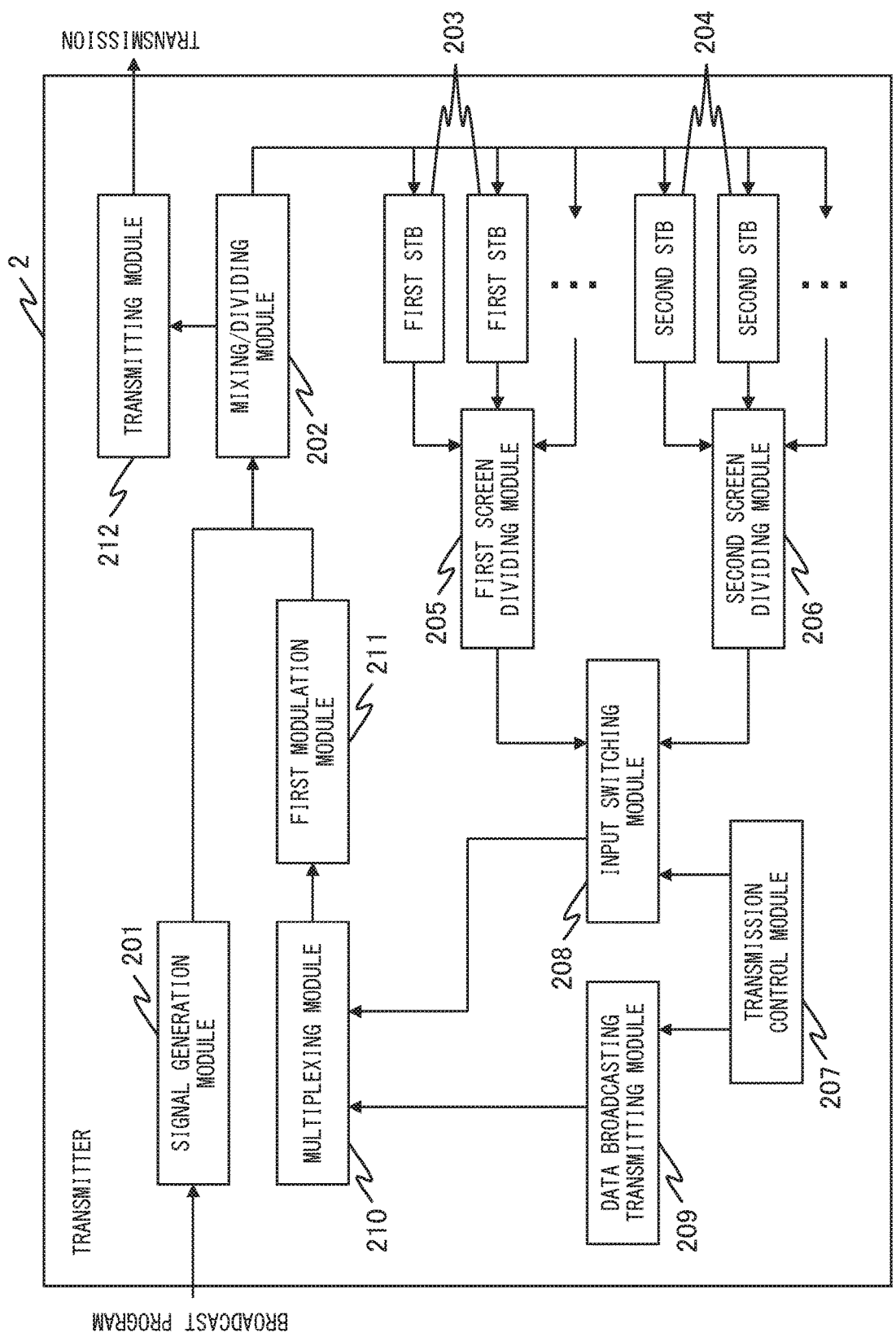
FIG. 4 is a diagram illustrating an example of a schematic configuration of a transmitter 2.

(A schematic configuration of the transmitter 2) FIG. 4 is a diagram illustrating an example of a schematic configuration of the transmitter 2.

The transmitter 2 has functions of generating program guide screen data and program guidance information data as broadcast data for selecting a broadcast program and transmitting the generated broadcast data to the receiver 3. For achieving these functions, the transmitter 2 includes a signal generation module 201, a mixing/dividing module 202, a first STB (Set Top Box) 203, a second STB 204, a first screen dividing module 205, a second screen dividing module 206, a transmission control module 207, an input switching module 208, a data broadcasting transmitting module 209, a multiplexing module 210, a first modulation module 211, and a transmitting module 212.

The signal generation module 201 acquires broadcast data including broadcast image data of a broadcast program provided by each of a plurality of broadcasting stations, and generates, on the basis of the acquired broadcast data, an OFDM (Orthogonal Frequency Division Multiplexing) signal. The signal generation module 201 then transmits the generated OFDM signal to the mixing/dividing module 202. The OFDM signal generated by the signal generation module 201 is a signal representing the broadcast image data of each broadcast program. The signal generation module 201 is an example of an acquisition module.

The mixing/dividing module 202 transmits the OFDM signal of the broadcast program of each of the plurality of broadcasting stations received from the signal generation module 201 to the first STB 203 and the second STB 204, and transmits an OFDM signal received from the first modulation module 211, which will be described later, to the transmitting module 212. The mixing/dividing module 202 is an example of a categorizing module.

The transmitter 2 includes a plurality of first STBs 203, each corresponding to each of broadcast programs included in the first group. Each first STB 203 generates, by demodulating the OFDM signal of each broadcast program included in the first group received from the mixing/dividing module 202, generates broadcast image data and transmits the generated broadcast image data to the input switching module 208.

The transmitter 2 also includes a plurality of second STBs 204, each corresponding to each of broadcast programs included in the second group. Each second STB 204 generates, by demodulating the OFDM signal of each broadcast program included in the second group received from the mixing/dividing module 202, generates broadcast image data and transmits the generated broadcast image data to the input switching module 208.

The first screen dividing module 205 is, for example, a screen dividing module and generates first program guide screen data for displaying each of the plural pieces of broadcast image data received from the first STB 203 in corresponding display frame defined in advance of the display frames arranged on the same screen. The first screen dividing module 205 then transmits the generated first program guide screen data to the input switching module 208.

The second screen dividing module 206 is, for example, a screen dividing module and generates second program guide screen data for displaying each of the plural pieces of broadcast image data received from the second STB 204 in corresponding display frame defined in advance of the display frames arranged on the same screen. The second screen dividing module 206 then transmits the generated second program guide screen data to the input switching module 208.

The transmission control module 207 is, for example, a control server. The transmission control module 207 generates instruction information for causing the input switching module 208 to transmit either one of the first program guide screen data and the second program guide screen data to the multiplexing module 210. The transmission control module 207 transmits the generated instruction information to the input switching module 208 each time a predetermined time interval passes.

The transmission control module 207 also transmits, at the predetermined time interval, screen identification information of the program guide screen data that the input switching module 208 transmits to the multiplexing module 210 to the data broadcasting transmitting module 209. In other words, the transmission control module 207 transmits, in the time period during which the first program guide screen data is transmitted, screen identification information indicating the first program guide screen data (for example, "Page. 1") to the data broadcasting transmitting module. The transmission control module 207 transmits, in the time period during which the second program guide screen data is transmitted, screen identification information indicating the second program guide screen data (for example, "Page. 2") to the data broadcasting transmitting module 209. For example, when the first program guide screen data is transmitted from 16:48:00 until 16:48:20, the transmission control module 207 transmits the screen identification information of "Page. 1" to the data broadcasting transmitting module. For example, when the second program guide screen data is transmitted from 16:48:20 until 16:48:40, the transmission control module 207 transmits the screen identification information of "Page. 2" to the data broadcasting transmitting module.

The input switching module 208 is, for example, an input switching device. The input switching module 208 transmits either one of the first program guide screen data received from the first screen dividing module 205 and the second program guide screen data received from the second screen dividing module 206 to the multiplexing module 210. Upon receiving instruction information from the transmission control module 207 while transmitting the first program guide screen data to the multiplexing module 210, the input switching module 208 stops transmission of the first program guide screen data and transmits the second program guide screen data to the multiplexing module 210. Upon receiving instruction information from the transmission control module 207 while transmitting the second program guide screen data to the multiplexing module 210, the input switching module 208 stops transmission of the second program guide screen data and transmits the first program guide screen data to the multiplexing module 210. In this manner, the input switching module 208 generates program guide screen data that switches between the first program guide screen data and the second program guide screen data at the predetermined time interval, and transmits the generated program guide screen data to the multiplexing module 210. The input switching module 208 is an example of a screen data generation module.

The data broadcasting transmitting module 209 generates broadcast program identification information corresponding to the plural pieces of broadcast image data contained in each of the first program guide screen data and the second program guide screen data. For example, the data broadcasting transmitting module 209 generates, on the basis of the broadcast program information input by a broadcaster that owns the transmitter 2, broadcast program identification information. The data broadcasting transmitting module 209 may acquire, from the mixing/dividing module 202, broadcast program identification information of the broadcast program transmitted to the first STB 203 and the second STB 204. Each piece of broadcast program identification information is associated with the display position of a display frame in which the broadcast program identification information is displayed.

The data broadcasting transmitting module 209 also generates, on the basis of the screen identification information received from the transmission control module 207, an event message for showing screen identification information at a predetermined time interval. For example, when the first program guide screen data is transmitted from 16:48:00 until 16:48:20, the data broadcasting transmitting module 209 generates an event message for showing "Page. 1". For example, when the second program guide screen data is transmitted from 16:48:20 until 16:48:40, the data broadcasting transmitting module 209 generates an event message for showing "Page. 2". In addition, the data broadcasting transmitting module 209 generates image data of graphics including a cursor graphic. The data broadcasting transmitting module 209 is an example of a broadcasting information generation module and the event message is an example of temporal information.

The data broadcasting transmitting module 209 then transmits various types of information, which have been generated, as broadcasting information data to the multiplexing module 210.

Upon receiving the program guide screen data from the input switching module 208 and the broadcasting information data from the data broadcasting transmitting module 209, the multiplexing module 210 multiplexes the program guide screen data and the broadcasting information data into a TS (Transport Stream) signal format to generate a TS signal. The multiplexing module 210 transmits the generated TS signal to the first modulation module 211. In a time period during which the program guide screen data represented by the TS signal is the first program guide screen data, the broadcasting information data contains an event message for showing "Page. 1". In a time period during which the program guide screen data represented by the TS signal is the second program guide screen data, the broadcasting information data contains an event message for showing "Page. 2".

Upon receiving the TS signal from the multiplexing module 210, the first modulation module 211 generates an OFDM signal on the basis of the acquired TS signal. The first modulation module 211 then transmits the generated OFDM signal to the transmitting module 212 via the mixing/dividing module 202. The first modulation module 211 may modulate the acquired TS signal by means of any modulation scheme, which is not limited to the modulation scheme that modulates the acquired TS signal into an OFDM signal, as long as the signal can be processed by the receiver 3. For example, the first modulation module 211 may generate, on the basis of the TS signal acquired from the multiplexing module 210, a 64-valued data by means of the 64QAM modulation scheme.

The transmitting module 212 transmits the received OFDM signal to the receiver 3 as a broadcast signal. With this operation, the broadcast data containing the program guide screen data and the broadcasting information data, which are generated by the transmitter 2, are transmitted from the transmitter 2 to the receiver 3.

Figure 5:
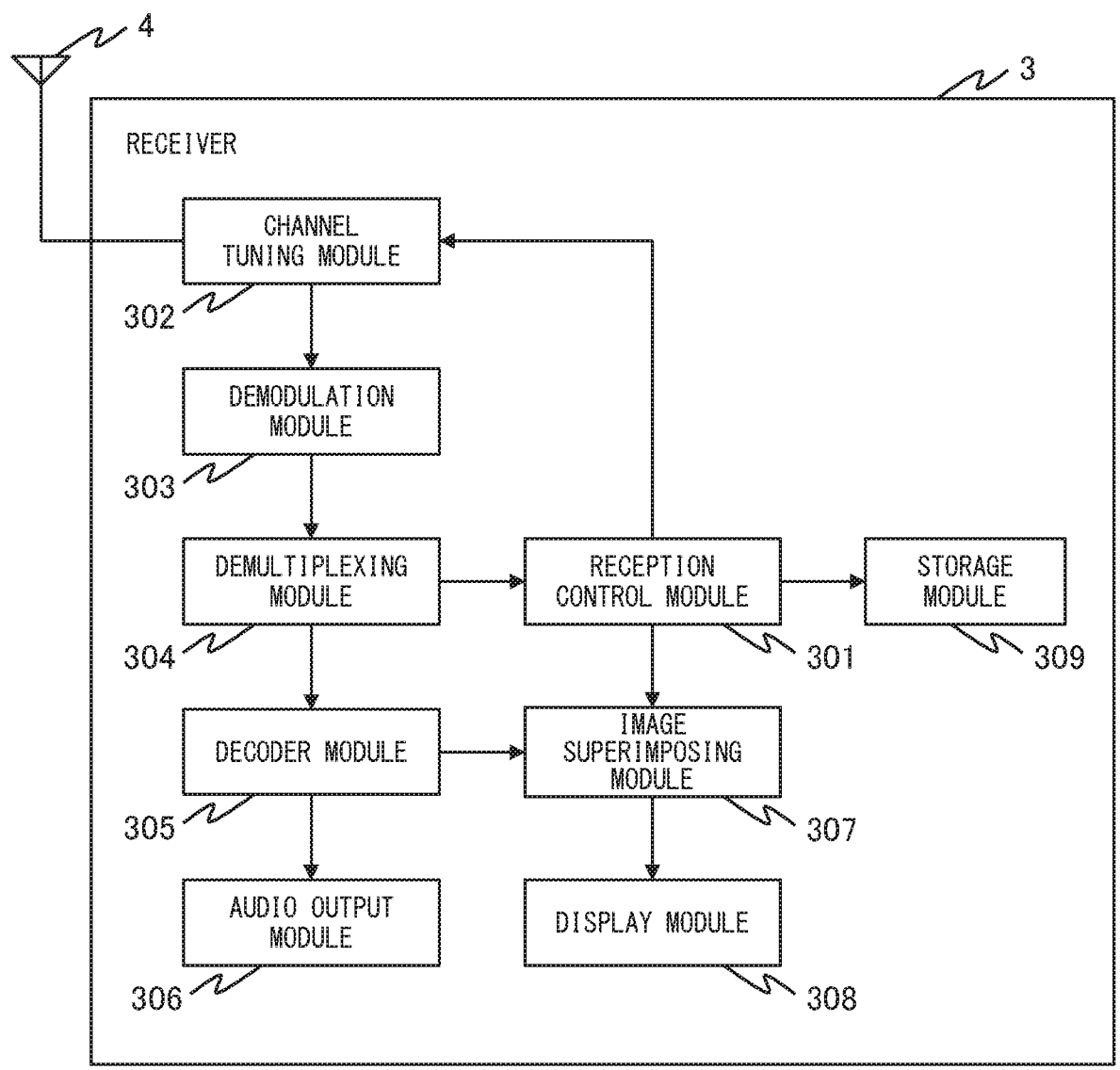
FIG. 5 is a diagram illustrating an example of a schematic configuration of a receiver 3.

(A schematic configuration of the receiver 3) FIG. 5 is a diagram illustrating an example of a schematic configuration of the receiver 3.

The receiver 3 has functions of receiving the broadcast data transmitted from the transmitter 2 and displaying a program guide screen on the basis of the received broadcast data. For achieving these functions, the receiver 3 includes a reception control module 301, a channel tuning module 302, a demodulation module 303, a demultiplexing module 304, a decoder module 305, an audio output module 306, an image superimposing module 307, a display module 308, and a storage module 309.

The reception control module 301 includes one or more processors and peripheral circuits thereof. The reception control module 301 controls an overall operation of the receiver 3 in an integrated manner and is, for example, a CPU (Central Processing Unit). The reception control module 301 transmits, according to an input selection signal received in response to an operation by a user with a control device such as a remote, a channel tuning instruction for tuning in to the selected broadcast program to the channel tuning module 302. The reception control module 301 also generates, on the basis of the broadcasting information data received from the demultiplexing module 304, image data of graphics such as the cursor graphic, character data, and the like, transmits the graphic image data, the character data, and the like, which have been generated, to the image superimposing module 307, and stores the received broadcasting information data in the storage module 309. When the storage module 309 stores a display position of the cursor graphic, the reception control module 301 reads out the display position from the storage module 309, and transmits the display position together with the graphic image data of the cursor graphic to the image superimposing module 307.

When a program guide screen is displayed on the display module 308, the reception control module 301 also transmits, in accordance with a movement instruction, which received in response to an operation by the user with a control device such as a remote, for the cursor graphic displayed in a superimposed manner on the program guide screen, position information of the display frame to which the cursor graphic is moved to the image superimposing module 307.

When a program guide screen is displayed on the display module 308, the reception control module 301 also selects, in accordance with a selection instruction, which is received in response to an operation by the user with a control device such as a remote, for the cursor graphic, the display frame in which the cursor graphic is located and stores the display position of the selected display frame in the storage module 309. In addition, the reception control module 301 acquires the event message contained in the broadcasting information data stored in the storage module 309 and the display position corresponding to the selected display frame. The reception control module 301 then determines, on the basis of the event message, which of the first program guide screen and the second program guide screen the displayed program guide screen is, and detects broadcast program identification information corresponding to the display frame at the acquired display position among the broadcast program identification information included in the first program guide screen. The reception control module 301 then transmits a channel tuning instruction for tuning in to the broadcast program corresponding to the selected broadcast program identification information to the channel tuning module 302. The reception control module 301 is an example of a detection module and a control module.

The channel tuning module 302 extracts, from the broadcast signals, which are received via the antenna module 4, corresponding to respective channels, a broadcast signal of the channel corresponding to the channel tuning instruction received from the reception control module 301. The channel tuning module 302 then transmits the extracted broadcast signal to the demodulation module 303. The channel tuning module 302 is an example of a reception module.

The demodulation module 303 performs an error correction as well as demodulation on the broadcast signal received from the channel tuning module 302 to convert the broadcast signal back to the TS signal. The demodulation module 303 then transmits the TS signal to the demultiplexing module 304.

Upon receiving the TS signal from the demodulation module 303, the demultiplexing module 304 separates the program guide screen data and the broadcasting information data contained in the TS signal. The demultiplexing module 304 transmits the program guide screen data to the decoder module 305 and also transmits the broadcasting information data to the reception control module 301. When the TS signal received from the demodulation module 303 is a TS signal representing broadcast data of a broadcast program transmitted from each broadcasting station, the demultiplexing module 304 separates broadcast image data, audio data, and broadcasting information data contained in the TS signal. In this case, the demultiplexing module 304 transmits the broadcast image data and the audio data to the decoder module 305 and also transmits the broadcasting information data to the reception control module 301.

The decoder module 305 decodes the program guide screen data, the broadcast image data, and the audio data received from the demultiplexing module 304. The decoder module 305 then transmits the program guide screen data and the broadcast image data, which have been decoded, to the image superimposing module 307 and also transmits the decoded audio data to the audio output module 306.

The audio output module 306 is, for example, a speaker and outputs the audio data received from the decoder module 305.

The image superimposing module 307 outputs image data, which is generated by superimposing the graphic image data, the character data, and the like, which have been received from the reception control module 301, on the program guide screen data or the broadcast image data, which have been received from the decoder module 305, to the display module 308. When the image superimposing module 307 receives the graphic image data of the cursor graphic together with the display position, the image superimposing module 307 outputs image data of the program guide screen data, in which the cursor graphic is disposed in the display frame corresponding to the display position, to the display module 308. The video output module 504 is an example of a second transmitting module.

When a program guide screen is displayed on the display module 308, the image superimposing module 307 outputs, upon receiving only the display position of the cursor graphic from the reception control module 301, image data of the program guide screen data, in which the cursor graphic is disposed in the display frame corresponding to the received display position, to the display module 308.

The display module 308 is, for example, a display device and outputs the image data received from the image superimposing module 307 for display. When the display module 308 receives the graphic image data of the cursor graphic together with the program guide screen data, the display module 308 displays the program guide screen on which the cursor graphic is superimposed. When the display module 308 receives broadcast image data of a broadcast program, the display module 308 displays the broadcast image data. The display module 308 is an example of an image data output module.

The storage module 309 includes, for example, a semiconductor memory device. The storage module 309 stores various types of programs, data, and the like used for processing by the reception control module 301. The storage module 309 stores, as data, the display position of the display frame in which the cursor graphic is located and the like.

(An outline of the first program guide screen data) FIG. 6A is a schematic diagram for explaining an outline of the first program guide screen data 600.

The first program guide screen data 600 contains broadcast image data 602 of first broadcast programs, which are disposed in respective display frames 601 and included in the first group. In an example illustrated in FIG. 6A, the display frames 601 are display frames, which are arranged in four rows and five columns defined on the same screen and which have the same rectangular shape. The arrangement of the display frames is not limited to four rows and five columns. For example, in accordance with a number of first broadcast programs included in the first group or a number of second broadcast programs included in the second group, the arrangement may be automatically changed. Each of the display frames 601 is associated with the display position of each display frame 601 and the broadcast program identification information of the broadcast program to be displayed. In the example illustrated in FIG. 6A, the display frame 601 in the first row from the top and the first column from the left is associated with the display position represented by the coordinate information for (1, 1) and the broadcast program identification information of CH-01.

(An outline of the second program guide screen data) FIG. 6B is a schematic diagram for explaining an outline of the second program guide screen data 610.

The second program guide screen data 610 contains broadcast image data 612 of second broadcast programs, which are disposed in respective display frames 611 and included in the second group. In an example illustrated in FIG. 6B, the display frames 611 are display frames, which are arranged in four rows and five columns defined on the same screen and which have the same rectangular shape as that of the display frames 601. Only some of the display frames 611 may be identical to the corresponding display frames 601. Each of the display frames 611 is associated with the display position of each display frame 611 and the broadcast program identification information of the broadcast program to be displayed. In the example illustrated in FIG. 6B, the display frame 611 in the first row from the top and the first column from the left is associated with the display position represented by the coordinate information for (1, 1) and the broadcast program identification information of CH-21.

(An outline of the cursor graphic) FIG. 7 is a schematic diagram for explaining an outline of a cursor graphic 700.

The cursor graphic 700 is disposed in any one of the display frames 701. In an example illustrated in FIG. 7, the display frames 701 are display frames, which are arranged in four rows and five columns defined on the same screen and which have the same rectangular shape as that of the display frames 601. Only some of the display frames 701 may be identical to the corresponding display frames 601. The cursor graphic is moved to and displayed at, in response to an operation by the user with a control device such as a remote, the position of any one of the display frames.

(Program guide screen) FIG. 8A is a diagram illustrating an example of the first program guide screen displayed by the receiver 3. In the example illustrated in FIG. 8A, in the first program guide screen, images (pictures) for displaying the broadcast image data of the first broadcast programs included in the first group are displayed. At the position of the predetermined display frame in the first program guide screen, the cursor graphic 700 is displayed. When the receiver 3 displays the first program guide screen, the display position of each display frame and the broadcast program identification information of the broadcast program to be displayed may be stored in the storage module 309.

FIG. 8B is a diagram illustrating an example of the second program guide screen displayed by the receiver 3. In the example illustrated in FIG. 8B, in the second program guide screen, images (pictures) for displaying the broadcast image data of the second broadcast programs included in the second group are displayed. At the position of the predetermined display frame in the second program guide screen, the cursor graphic 700 is displayed. When the receiver 3 displays the second program guide screen, the display position of each display frame and the broadcast program identification information of the broadcast program to be displayed may be stored in the storage module 309.

(An example of a screen displaying a broadcast image of a broadcast program) FIG. 9A is a diagram illustrating an example of the first program guide screen displayed by the receiver 3. The cursor graphic 700 is moved to and displayed at, in response to an operation by the user with a control device such as a remote, the position of each display frame on the screen. In the example illustrated in FIG. 9A, the cursor graphic 700 is displayed at the position of the display frame corresponding to channel 12.

FIG. 9B is a diagram illustrating an example of a screen displaying a broadcast image of a broadcast program to be displayed by the receiver 3. In the example illustrated in FIG. 9B, when a selection instruction is input in the first program guide screen illustrated in FIG. 9A in response to an operation by the user with a control device, broadcast image data of a first broadcast program (channel 12) corresponding to the display position of the display frame in which the cursor graphic is located is displayed.

FIG. 10A is a diagram illustrating an example of the second program guide screen displayed by the receiver 3. The cursor graphic is moved to and displayed at, in response to an operation by the user with a control device such as a remote, the position of each display frame on the screen. In the example illustrated in FIG. 10A, the cursor graphic 700 is displayed at the position of the display frame corresponding to channel 29.

Figure 10B:
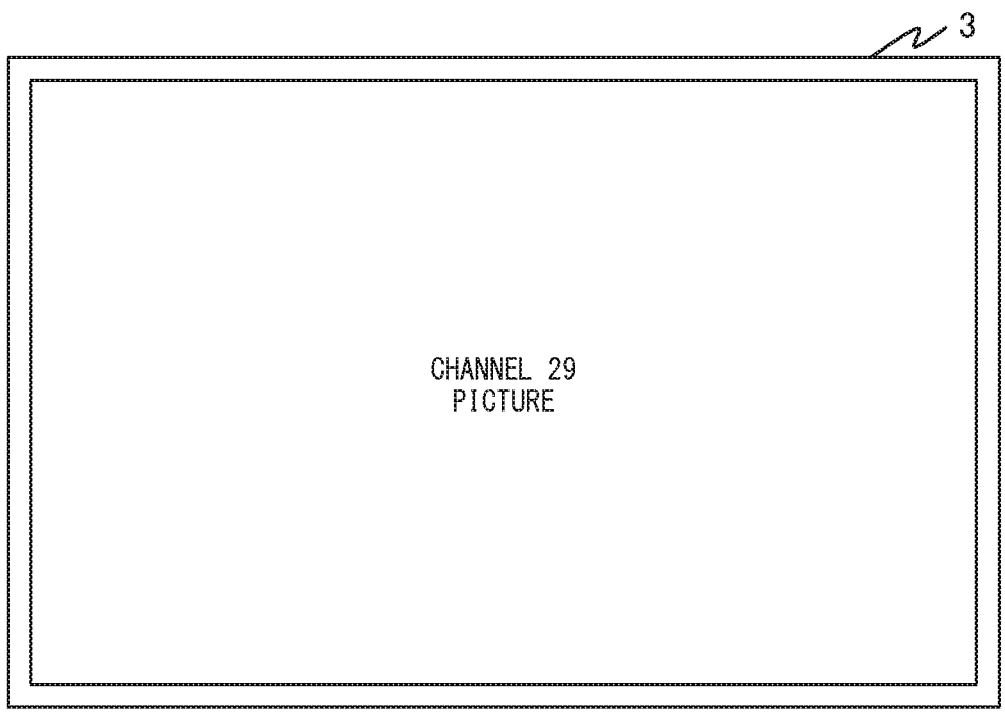
FIG. 10B is a diagram illustrating an example of a screen displaying a broadcast image of a broadcast program.

FIG. 10B is a diagram illustrating an example of a screen displaying a broadcast image of a broadcast program to be displayed by the receiver 3. In the example illustrated in FIG. 10B, when a selection instruction is input in the second program guide screen illustrated in FIG. 10A in response to an operation by the user with a control device, broadcast image data of a second broadcast program (channel 29) corresponding to the display position of the display frame in which the cursor graphic is located is displayed.

Figure 11:
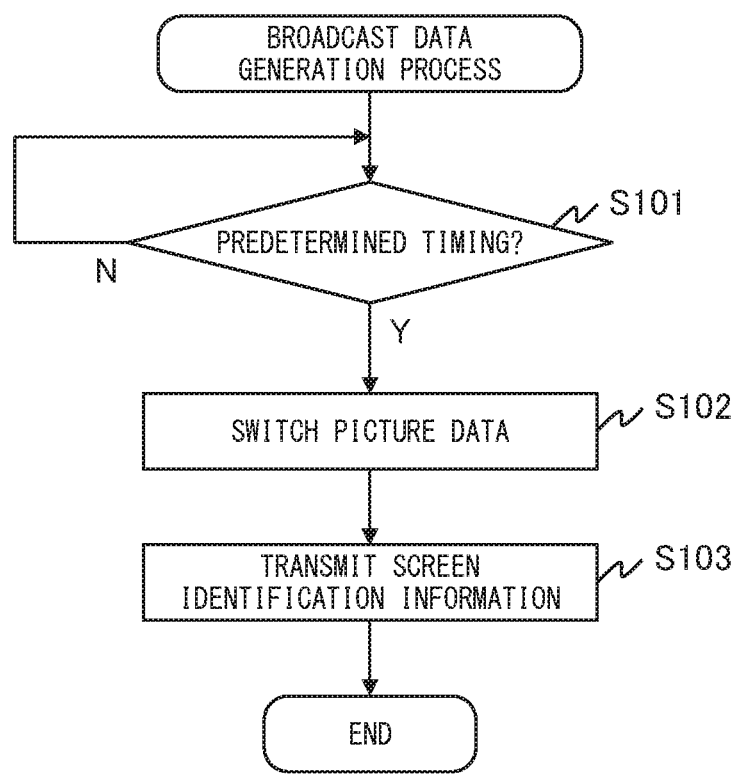
FIG. 11 is a diagram illustrating an example of an operation sequence of a broadcast data generation process.

(Broadcast data generation process) FIG. 11 is a diagram illustrating an example of an operation sequence of a broadcast data generation process performed by the transmission control module 207.

The transmission control module 207 monitors whether the current time has reached a predetermined timing (step S101). In other words, when a predetermined time interval has passed, the transmission control module 207 determines that the current time has reached the predetermined timing.

Next, when the transmission control module 207 determines that the current time has reached the predetermined timing (step S101—Yes), the transmission control module 207 switches the program guide screen data (step S102). In other words, the transmission control module 207 transmits the generated instruction information to the input switching module 208.

The transmission control module 207 then transmits screen identification information of the program guide screen data to which the switching is made to the data broadcasting transmitting module 209 (step S103), and the transmission control module 207 ends a series of steps. The data broadcasting transmitting module 209 generates an event message containing the screen identification information. When the series of steps for the broadcast data generation process are completed, the transmission control module 207 performs the broadcast data generation process again.

Figure 12:
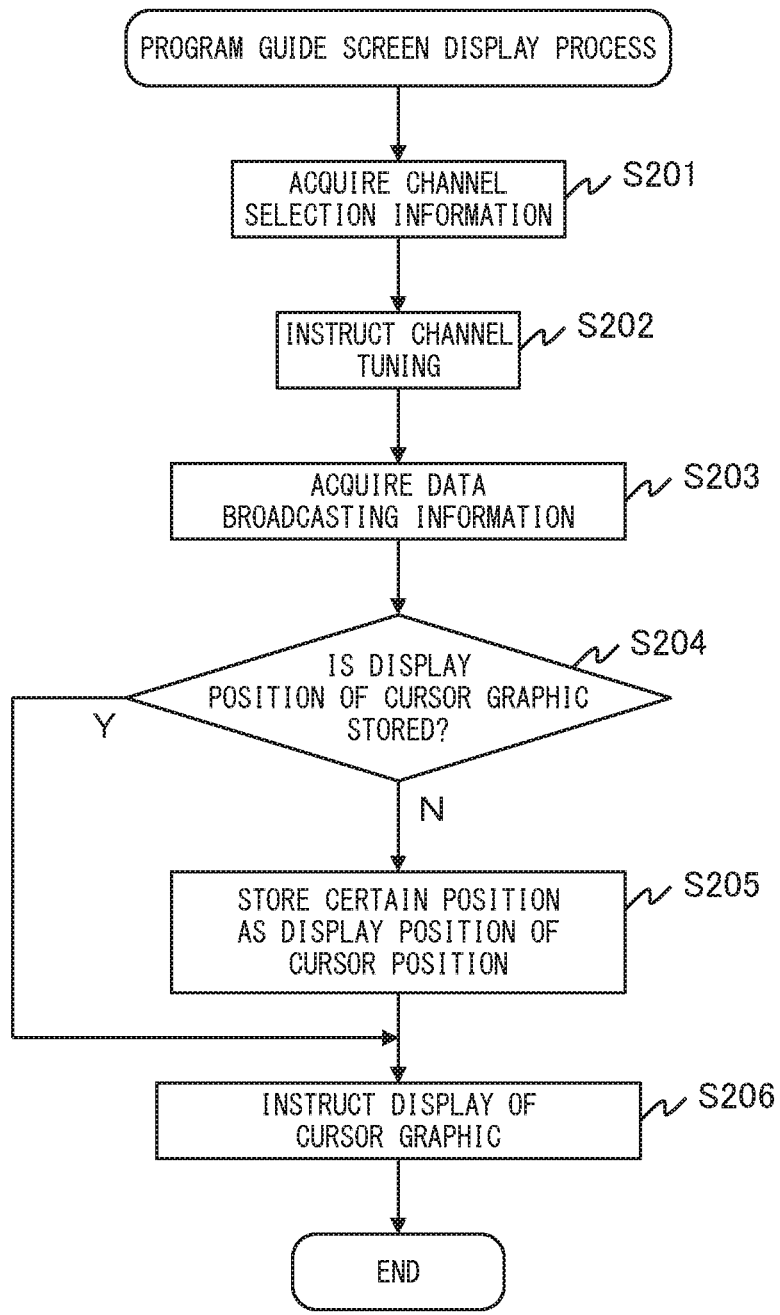
FIG. 12 is a diagram illustrating an example of an operation sequence of a process of displaying a program guide screen.

(Process of displaying a program guide screen) FIG. 12 is a diagram illustrating an example of an operation sequence of a process of displaying a program guide screen performed by the reception control module 301.

First, the reception control module 301 acquires channel selection information (step S201).

The reception control module 301 then transmits the acquired channel tuning instruction to the channel tuning module 302 (step S202).

Subsequently, the reception control module 301 acquires data broadcasting information from the demultiplexing module 304 (step S203).

The reception control module 301 then determines whether the storage module 309 stores the display position of the cursor graphic (step S204).

When the reception control module 301 determines that the storage module 309 does not store the display position of the cursor graphic (step S204—No), the reception control module 301 then sets a certain position (for example, coordinate information for (1, 1) etc.) as the display position of the cursor graphic, and stores the position in the storage module 309 (step S205). When the reception control module 301 determines that the storage module 309 stores the display position of the cursor graphic (step S204—Yes), the reception control module 301 advances the process to the step S206.

The reception control module 301 then reads out the display position of the cursor graphic stored in the storage module 309, passes the graphic image data and the display position of the cursor graphic to the image superimposing module 307, and transmits a display instruction (step S206); thus, the reception control module 301 ends the series of steps.

Figure 13:
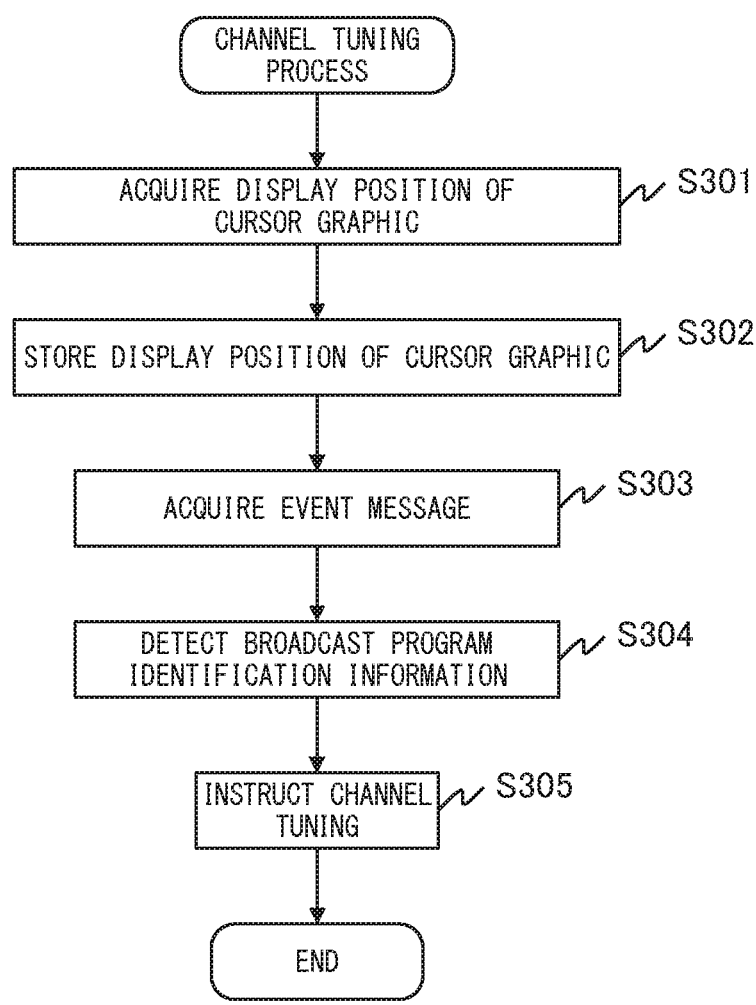
FIG. 13 is a diagram illustrating an example of an operation sequence of a channel tuning process.

(Channel tuning process) FIG. 13 is a diagram illustrating an example of an operation sequence of the channel tuning process performed by the reception control module 301.

First, the reception control module 301 acquires the display position of the cursor graphic (step S301).

The reception control module 301 then stores the display position of the cursor graphic in the storage module 309 (step S302).

Subsequently, the reception control module 301 acquires an event message contained in the broadcasting information data stored in the storage module 309 (step S303).

The reception control module 301 then detects broadcast program identification information (step S304). In other words, the reception control module 301 determines, on the basis of the event message, which of the first program guide screen and the second program guide screen the displayed program guide screen is, and detects the broadcast program identification information corresponding to the display frame at the acquired display position among the broadcast program identification information included in the first program guide screen.

The reception control module 301 then transmits a channel tuning instruction for tuning in to the broadcast program corresponding to the selected broadcast program identification information to the channel tuning module 302 (step S305).

As described above, the transmission/reception system 1 can provide plural pieces of program guide screen data to a user and prevent an image etc. for introducing each program from becoming too small on each program guide screen. Thus, the user can easily select a broadcast program, and it is possible to provide a program guide screen having high visibility for a viewer irrespective of the number of broadcast programs to be provided with guidance.

Figure 14:
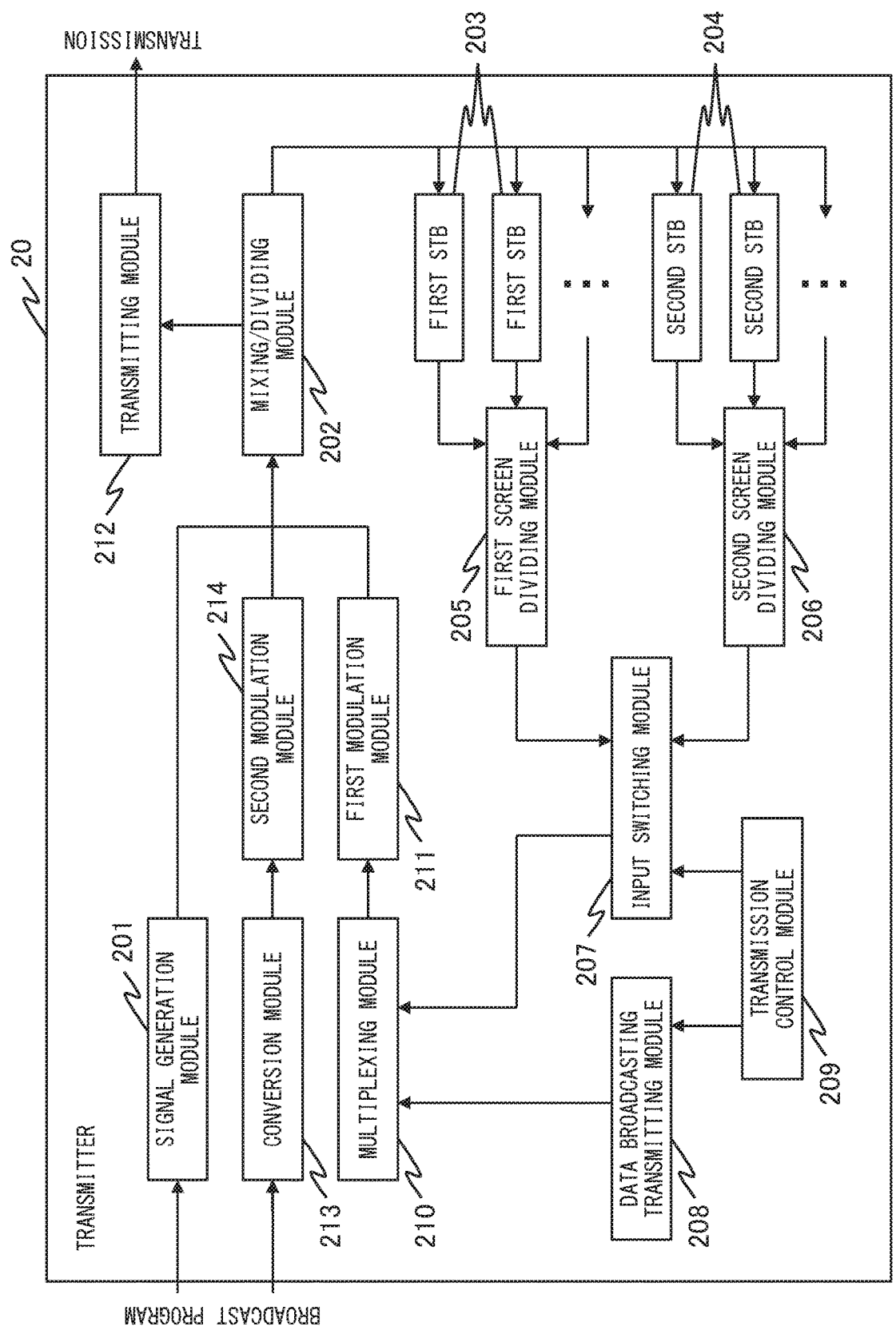
FIG. 14 is a diagram illustrating an example of a schematic configuration of a transmitter 20.

(Variation 1) The transmitter 2 may acquire broadcast image data corresponding to a broadcast program of BS (Broadcasting Satellite) broadcasting or CS (Communications Satellite) broadcasting. FIG. 14 is a diagram illustrating an example of a schematic configuration of a transmitter 20. In FIG. 14, the same reference signs denote the same components as those of the transmitter 2 illustrated in FIG. 4, and thus, description thereof is omitted.

Upon acquiring a broadcast signal representing broadcast data corresponding to a broadcast program of CS broadcasting, the conversion module 213 converts the acquired broadcast signal into a TS signal.

Upon receiving the TS signal from the conversion module 213, the second modulation module 214 generates an OFDM signal on the basis of the acquired TS signal. The second modulation module 214 then transmits the generated OFDM signal to the first STB or the second STB via the mixing/dividing module 202. The first modulation module 211 and the second modulation module 214 may modulate the acquired TS signal by means of any modulation scheme as long as the generated signal can be processed by the first STB or the second STB. For example, the first modulation module 211 may generate, on the basis of the TS signal acquired from the multiplexing module 210, a 64-valued data by means of the 64QAM modulation scheme, and the second modulation module 214 may generate, on the basis of the TS signal acquired from the conversion module 213, a 64-valued data by means of the 64QAM modulation scheme.

With this operation, the transmitter 2 can transmit program guide screen data and also transmit plural pieces of broadcast image data corresponding to broadcast programs.

(Variation 2) The receiver 3 may output the received broadcast data via a CATV network. FIG. 15 is a diagram illustrating an example of a schematic configuration of a receiver 30. In FIG. 15, the same reference signs denote the same components as those of the receiver 3 illustrated in FIG. 5, and thus, description thereof is omitted.

The receiver 30 further includes a dividing module 310, a first channel tuning module 311, and a second channel tuning module 312.

The dividing module 310 transmits, in accordance with a channel tuning instruction from the reception control module 301, a broadcast signal representing broadcast data of a broadcast program of digital terrestrial broadcasting to the first channel tuning module 311, and also transmits a broadcast signal representing broadcast data of a broadcast program that is independently broadcast by a cable television operator to the second channel tuning module 312.

The first channel tuning module 311 extracts, from the broadcast signals representing broadcast data of broadcast programs of digital terrestrial broadcasting, which is received via the CATV network, a broadcast signal of the channel corresponding to the channel tuning instruction received from the reception control module 301.

The second channel tuning module 312 extracts, from the broadcast signals representing broadcast data of broadcast programs that is independently broadcast by the cable television operator, which is received via the CATV network, a broadcast signal of the channel corresponding to the channel tuning instruction received from the reception control module 301.

Thus, the receiver 30 can support both of broadcast data of a broadcast program of digital terrestrial broadcasting and broadcast data of a broadcast program that is independently broadcast by a cable television operator.

(Variation 3) The cursor graphic displayed on the display module 308 may be displayed in a display mode according to a predetermined condition. For example, the transmitter 2 adds additional information such as a viewer rating, a number of viewers, and recommendation to each piece of broadcast program identification information, and transmits the resultant information as broadcasting information data to the receiver 3. The reception control module 301 of the receiver 3 refers to the broadcasting information data stored in the storage module 309; when the broadcast program identification information corresponding to the display frame in which the cursor graphic is located is associated with the additional information, the reception control module 301 changes a display mode of the cursor graphic and causes the display module 308 to display the cursor graphic. The display mode includes a color, a size, a style (a dotted line or a bold line) of the cursor graphic, or dynamic display of the cursor graphic, etc. The reception control module 301 detects, in accordance with a selection instruction for the cursor graphic received in response to an operation by the user with a control device such as a remote, broadcast program identification information corresponding to the display frame in which the cursor graphic is located, transmits a channel tuning instruction for selecting a broadcast program corresponding to the detected broadcast program identification information to the channel tuning module 302, and transmits, to the transmission control module 207 of the transmitter 2, viewing history data with respect to the identification information of the broadcast program in to which the tuning was made via a predetermined communication network such as the Internet. With this operation, the transmission control module 207 can generate additional information such as a viewer rating, a number of viewers, and recommendation with respect to each piece of broadcast program identification information. In this case, the transmitter 2 and the receiver 3 include a communication module that connects to a communication network such as the Internet.

In this manner, the broadcaster can visually present additional information for a broadcast program corresponding to the display frame in which the cursor graphic is located.

(Variation 4) The receiver 3 may change, on the basis of viewer identification information for identifying the user of the receiver 3, the display mode of broadcasting information data contained in broadcast data, and display the broadcasting information data for which the display mode is changed on the display module 308.

First, the reception control module 301 of the receiver 3 generates, on the basis of viewer identification information, subscription information and the like stored in the storage module 309, viewing availability information associated with each piece of broadcast program identification information for identifying each of broadcast programs. The subscription information includes information indicating that the broadcast program is available for viewing when a contract is entered into, information indicating that the broadcast program is available for viewing even when a contract is not entered into, or information indicating, when a contract is required, that a contract has been entered into, etc. The viewer identification number may be an individual identification number (STBID etc.) unique to each receiver 3. The viewer identification number may be an identification information stored in a storage medium provided by a broadcaster such as a C-CAS (Conditional Access System) card; in this case, the receiver 3 includes a loading module for loading the storage medium (a slot for a CAS card etc.).

The reception control module 301 then detects, in accordance with a selection instruction for the cursor graphic received in response to an operation by the user with a control device such as a remote, broadcast program identification information corresponding to the display frame in which the cursor graphic is located. Subsequently, the reception control module 301 determines whether viewing availability information associated with the detected broadcast program identification information is information indicating that viewing is available.

The reception control module 301 transmits, when the viewing availability information associated with the detected broadcast program identification information is information indicating that viewing is available, a channel tuning instruction for tuning in to the broadcast program corresponding to the detected broadcast program identification information to the channel tuning module 302.

The reception control module 301 transmits, when the viewing availability information associated with the detected broadcast program identification information is not information indicating that viewing is available, graphic image data for displaying an unavailable-for-viewing image to the image superimposing module 307. The image superimposing module 307 then displays, on the basis of the graphic image data for displaying the unavailable-for-viewing image received from the reception control module 301, image data containing the unavailable-for-viewing image on the display module 308. The display module 308 outputs the image data containing the unavailable-for-viewing image received from the image superimposing module 307 for display.

(Variation 5) The receiver 3 may change, on the basis of viewer attribute identification information representing an attribute of the user, the display mode of broadcasting information data contained in broadcast data, and display the broadcasting information data for which the display mode is changed on the display module 308.

The reception control module 301 of the receiver 3 stores, on the basis of the viewer identification information stored in the storage module 309 or in response to an operation by the user with a control device such as a remote, the viewer attribute identification information representing the attribute of the user in the storage module 309.

The transmission control module 207 of the transmitter 2 stores advertising information (graphic image data or character data) specified for each viewer attribute in advance in association with the viewer attribute. The transmission control module 207 transmits the advertising information associated with each of viewer attributes together with a display position thereof to the data broadcasting transmitting module 209. Subsequently, the data broadcasting transmitting module 209 generates graphic image data containing the cursor graphic and the transmitted advertising information corresponding to the transmitted display position. The data broadcasting transmitting module 209 then generates broadcasting information data containing the generated graphic image data and transmits the broadcasting information data to the multiplexing module 210. A TS signal generated by the multiplexing module 210 is then transmitted, via the first modulation module 211 and the mixing/dividing module 202, as an OFDM signal to the transmitting module 212.

The reception control module 301 of the receiver 3 then generates, on the basis of the broadcasting information data based on the received broadcast signal and the viewer attribute information stored in the storage module, graphics image data containing advertising information associated with the viewer attribute information and the cursor graphic, character data, and the like, and transmits the graphic image data, the character data, and the like, which have been generated, to the image superimposing module 307.

With this operation, the user can cause advertising information according to his or her attribute to be displayed. The graphic image data for showing the advertising information may be transmitted via a predetermined communication network such as the Internet from the transmission control module 207 to the receiver 3. In this case, the transmitter 2 and the receiver 3 include a communication module that connects to a communication network such as the Internet. The reception control module 301 of the transmitter 2 transmits, at a predetermined time interval or upon performing channel tuning, a request for transmission of the advertising information to the transmission control module 207 via the predetermined communication network. The transmission control module 207 then transmits the generated advertising information associated with each of viewer attributes together with a display position thereof to the transmitter 2. The reception control module 301 of the receiver 3 then generates, on the basis of the broadcasting information data based on the received broadcast signal, the received advertising information, and the viewer attribute information stored in the storage module, graphics image data containing advertising information associated with the viewer attribute information and the cursor graphic, character data, and the like, and transmits the graphic image data, the character data, and the like, which have been generated, to the image superimposing module 307.

In the process of changing the display mode of broadcasting information data contained in broadcast data on the basis of the viewer attribute identification information representing the attribute of the user, the broadcasting information data is not limited to the one containing the advertising information. The broadcasting information data may be one containing regional guidance information, program guidance information, information about a broadcasting station, etc.

The communication between the transmission control module 207 and the receiver 3 via the predetermined communication network may utilize a service such as Hybridcast. In this case, the information to be communicated are graphic image data, character data and/or control data, which are described by a description language such as BML (Broadcast Markup Language), HTML (HyperText Markup Language) 5, or XML (Extensible Markup Language). In this manner, the transmission control module 207 can associate the display position of the display frame with URLs (Uniform Resource Locators) of various websites, and the receiver 3 can display, in accordance with designation of the display frame by the user, the various websites.

It should be understood that those skilled in the art may make various changes, substitutions, and alterations hereto without departing from the spirit and scope of the present invention.

REFERENCE SIGNS LIST

1 Transmission/reception system
2 Transmitter
201 Signal generation module
202 Mixing/dividing module
203 First STB
204 Second STB
205 First screen dividing module
206 Second screen dividing module
207 Transmission control module
208 Input switching module
209 Data broadcasting transmitting module
210 Multiplexing module
211 First modulation module
212 Transmitting module
213 Conversion module 214 Second modulation module
3 Receiver
301 Reception control module
302 Channel tuning module
303 Demodulation module
304 Demultiplexing module
305 Decoder module
306 Audio output module
307 Image superimposing module
308 Display module
309 Storage module
310 Dividing module
311 First channel tuning module
312 Second channel tuning module
4 Antenna module

The invention claimed is:

1. A transmission/reception system having comprising:
a transmitter; and
a receiver, wherein
the transmitter comprises:
  a first circuit that:
    acquires plural pieces of broadcast image data corresponding to broadcast programs;
    categorizes the acquired plural pieces of broadcast image data at least into a first group and a second group;
    generates program guide screen data that switches, at a predetermined time interval, between first program guide screen data for displaying plural pieces of broadcast image data included in the first group in respective display frames arranged on a same screen and second program guide screen data for displaying plural pieces of broadcast image data included in the second group in respective display frames that are identical to the display frames arranged on a same screen;
    generates temporal information about the predetermined time interval and broadcast program identification information corresponding to plural pieces of broadcast image data contained in each of the first program guide screen data and the second program guide screen data; and
    transmits the program guide screen data, the temporal information, and the broadcast program identification information, and
the receiver comprises:
  a second circuit that:
    receives the plural pieces of broadcast image data corresponding to broadcast programs, the program guide screen data, the temporal information, and the broadcast program identification information;
    outputs the program guide screen data;
    detects, when any one of the display frames is selected by a user operation, broadcast program identification information contained in the first program guide screen data or the second program guide screen data output at the time of selection and corresponding to the selected display frame; and
    executes control in such a way that the broadcast image data corresponding to the detected broadcast program identification information are output from the image data output device.

2. The transmission/reception system according to claim 1, wherein the received broadcast image data corresponding to broadcast programs are contained in broadcast data transmitted from a broadcasting station.

3. The transmission/reception system according to claim 1, wherein the first circuit transmits the plural pieces of broadcast image data corresponding to broadcast programs to the receiver.

4. The transmission/reception system according to claim 1,
wherein the second circuit further:
  displays a program guide screen, based on the program guide screen data;
  displays a cursor graphic at a position of any one of the display frames arranged in the displayed program guide screen in such a way that the cursor graphic can move; and
  selects, when selection is input by a user, a display frame in which the cursor graphic is located.

5. The transmission/reception system according to claim 4,
wherein the receiver further comprises a memory,
and wherein the second circuit further:
  stores a display position of the selected display frame in the memory; and
  acquires, when a user instructs output of the program guide screen data, the display position stored in the memory, displays a program guide screen, and displays the cursor graphic in a display frame at the acquired display position.

6. The transmission/reception system according to claim 4, wherein the cursor graphic is displayed in a display mode according to a predetermined condition.

7. A transmitter for transmitting broadcast data to a receiver, the transmitter comprising:
a circuit that:
  acquires plural pieces of broadcast image data corresponding to broadcast programs;
  categorizes the acquired plural pieces of broadcast image data at least into a first group and a second group;
  generates program guide screen data that switches, at a predetermined time interval, between first program guide screen data for displaying plural pieces of broadcast image data included in the first group in respective display frames arranged on a same screen and second program guide screen data for displaying plural pieces of broadcast image data included in the second group in respective display frames that are identical to the display frames arranged on a same screen;
  generates temporal information about the predetermined time interval and broadcast program identification information corresponding to plural pieces of broadcast image data contained in each of the first program guide screen data and the second program guide screen data; and
  transmits the program guide screen data, the temporal information, and the broadcast program identification information to the receiver.

8. A transmission/reception method using a transmission/reception system that comprises a transmitter and a receiver including an image data output device, the transmission/reception method comprising:
  acquiring, by the transmitter, plural pieces of broadcast image data corresponding to broadcast programs;
  categorizing, by the transmitter, the acquired plural pieces of broadcast image data at least into a first group and a second group;
  generating, by the transmitter, program guide screen data that switches, at a predetermined time interval, between first program guide screen data for displaying plural pieces of broadcast image data included in the first group in respective display frames arranged on a same screen and second program guide screen data for displaying plural pieces of broadcast image data included in the second group in respective display frames that are identical to the display frames arranged on a same screen;

generating, by the transmitter, temporal information about the predetermined time interval and broadcast program identification information corresponding to plural pieces of broadcast image data contained in each of the first program guide screen data and the second program guide screen data; and transmitting, by the transmitter, the program guide screen data, the temporal information, and the broadcast program identification information, receiving, by the receiver, the plural pieces of broadcast image data corresponding to broadcast programs, the program guide screen data, the temporal information, and the broadcast program identification information;

outputting, by the receiver, the program guide screen data;

detecting, by the receiver, when any one of the display frames is selected by a user operation, broadcast program identification information contained in the first program guide screen data or the second program guide screen data output at the time of selection and corresponding to the selected display frame; and performing, by the receiver, control in such a way that the broadcast image data corresponding to the detected broadcast program identification information are output from the image data output device.

* * * * *